United States Patent [19]

Smart et al.

[11] Patent Number: 4,887,213
[45] Date of Patent: Dec. 12, 1989

[54] SYSTEM FOR, AND METHODS OF, PROVIDING FOR A DETERMINATION OF THE MOVEMENT OF AN AIRBORNE VEHICLE IN THE ATMOSPHERE

[75] Inventors: Anthony E. Smart, Costa Mesa; Roger P. Woodward, San Francisco, both of Calif.

[73] Assignee: The Titan Corporation, San Diego, Calif.

[21] Appl. No.: 80,334

[22] Filed: Jul. 31, 1987

[51] Int. Cl.[4] ............................................. G01P 3/36
[52] U.S. Cl. ................................ 364/424.01; 356/28.5
[58] Field of Search ...................... 364/424, 436, 565; 356/28.5; 340/968

[56] References Cited

U.S. PATENT DOCUMENTS

| | | | |
|---|---|---|---|
| 3,856,402 | 12/1974 | Low et al. | 356/28.5 |
| 3,915,572 | 10/1975 | Orloff | 356/28.5 |
| 3,984,685 | 10/1976 | Fletcher et al. | 356/28.5 |
| 3,984,686 | 10/1976 | Fletcher et al. | 356/28.5 |
| 4,167,329 | 9/1979 | Jelalian et al. | 356/28.5 |
| 4,483,614 | 11/1984 | Rogers | 356/28.5 |
| 4,585,341 | 4/1986 | Woodfield | 356/28.5 |
| 4,589,070 | 5/1986 | Kyrazis | 364/424 |
| 4,652,122 | 3/1987 | Zinione et al. | 356/28.5 |

*Primary Examiner*—Parshotam S. Lall
*Assistant Examiner*—Thomas G. Black
*Attorney, Agent, or Firm*—Ellsworth R. Roston; Charles H. Schwartz

[57] ABSTRACT

Light from a moving airborne vehicle and scattered from atmospheric particles produces at first and second detectors at the vehicle, signals which are spatially and spectrally filtered, and conditioned by amplification and special filtering and converted to digital signals. The digital signals are edited and accepted if they satisfy certain conditions pertaining to a threshold variable with the average amplitude level of the noise plus signals. The digital signals from each particle are grouped. A centroid, based upon a weighting of the signals in each group with amplitude and time, is determined to represent the most probable time at which the particle crossed the peak of the illuminated region. The peak amplitude of each signal from the first detector is paired with the peak amplitude of the successive signals from the second detector. The time difference between the paired signals, and their product amplitudes, are determined. The amplitude products are separated into successive bins on the basis of the time difference between the signals in each pair and are averaged. The bin with the greated average amplitude product and the two (2) adjacent bins are selected. The median time in the bin having the highest average product amplitude is used as a first approximation to the transmit time of a particle. An estimate with enhanced accuracy may be obtained by calculating the "centroid", by a method analogous to that used above, of a narrow distribution of events selected from those within the three (3) chosen bins.

40 Claims, 5 Drawing Sheets

| DETECTOR ARRAY 38 | DETECTOR ARRAY 40 | TIME DIFFERENCE |
|---|---|---|
| $A_1$ | $B_{1.0}$ | $A_1 - B_{1.0}$ |
|  | $B_{1.1}$ | $A_1 - B_{1.1}$ |
| $A_2$ | $B_{1.3}$ | $A_1 - B_{1.3}$ |
|  | $B_{2.0}$ | $A_2 - B_{2.0}$ |
|  | $B_{2.1}$ | $A_2 - B_{2.1}$ |
| $A_3$ | $B_{3.0}$ | $A_3 - B_{3.0}$ |
|  | $B_{3.1}$ | $A_3 - B_{3.1}$ |

SYSTEM FOR, AND METHODS OF, PROVIDING FOR A DETERMINATION OF THE MOVEMENT OF AN AIRBORNE VEHICLE IN THE ATMOSPHERE

This invention relates to a system for determining atmospheric data relating to the movements of an airborne vehicle. More particularly, the invention relates to a system included in the airborne vehicle for using energy scattered from aerosol particles in the atmosphere to determine a function of the movement and attitude of the airborne vehicle in the atmosphere.

Mechanical instruments have long been used to measure the relative speed between a moving object such as an airborne vehicle and the free airstream through which the airborne vehicle is moving. These mechanical instruments determine the kinetic pressure exerted by the moving airstream on a first defined area disposed on the airborne vehicle and facing the airstream. The mechanical instruments also determine the static pressure exerted on a second defined area disposed on the airborne vehicle in substantially perpendicular relationship to the first defined area. The systems then compare the kinetic and static pressures to determine the relative air speed of the vehicle.

The mechanical instruments now in use typically employ Pitot tubes, pragmatic tubing and pressure transducers which are exposed to the external environment and are accordingly subject to degraded performance resulting from calibration changes from various causes such aging or changes in temperature. They are also subject to catastrophic failures as a result of accidental breakage. Furthermore, they protrude physically into the airflow and provide a drag on the movement of the airborne vehicle.

As air navigation becomes increasingly complex, it becomes important to determine other data than the movement of the airborne vehicle relative to the ground. For example, it becomes increasingly important to know the characteristics of the air flow around the vehicle at each instant so that the response of the vehicle to such air flow can be properly controlled. The equipment now in use and discussed in the previous paragraphs has not been found satisfactory to provide the sensitive and accurate data which is now often required.

A considerable effort has been made for a long period of time, and substantial sums of money have been expended during such period, to develop a system which will overcome the disadvantages discussed above. For example, systems have been developed using aerosol particles in the atmosphere to obtain desired air data. Such systems have directed energy from the airborne vehicle in such forms as substantially coherent light and/or radiation to the aerosol particles and have received coherent light scattered from the aerosol particles. Such systems have then processed the received signals to obtain the desired data. Although such systems appear to be promising, they have not yet demonstrated the performance that may be realized by this invention and do not provide as accurate, sensitive and reliable information as may otherwise be desired.

This invention provides a system for overcoming the above disadvantages. In one embodiment, light from a moving airborne vehicle ad scattered from particles in the atmosphere produces, at first and second detectors at the vehicle, signals indicative of such scattered light. To reduce the effects of noise from stray light, the optical signals are spatially and spectrally filtered before detection. After optical detection, the electronic signals are further conditioned by amplification and special filtering.

The retained signals are converted to digital signals. The digital signals are edited and accepted if they satisfy certain conditions pertaining to a selected threshold varied in accordance with the average amplitude level of the noise plus signal. The digital sampled signals from each particle are grouped. A centroid, based upon a weighting of the signals in each group in accordance with amplitude and time, is determined to represent the most probable time at which the particle crossed the peak of the illuminated region.

The peak amplitude of each signal from the first detector is paired with the peak amplitude of the successive signals from the second detector. The time difference between the paired signals, and their product amplitudes, are determined. The amplitude products are separated into successive bins on the basis of the time difference between the signals in each pair. The amplitude products in each bin are averaged. The bin with the greatest average amplitude product and the two (2) adjacent time bins are then selected.

The median time in the bin having the highest average product amplitude is used as a first approximation to the transit time of a particle between the two sheets. An estimate with enhanced accuracy may be obtained by calculating the "centroid", by a method analogous to that used above, of the distribution of events in the three (3) chosen bins. The movement of the airborne vehicle may be determined from the selected time difference. Replication of the transit system to provide at least three pairs of illuminated regions may permit the direction to be obtained also.

Figure 1:
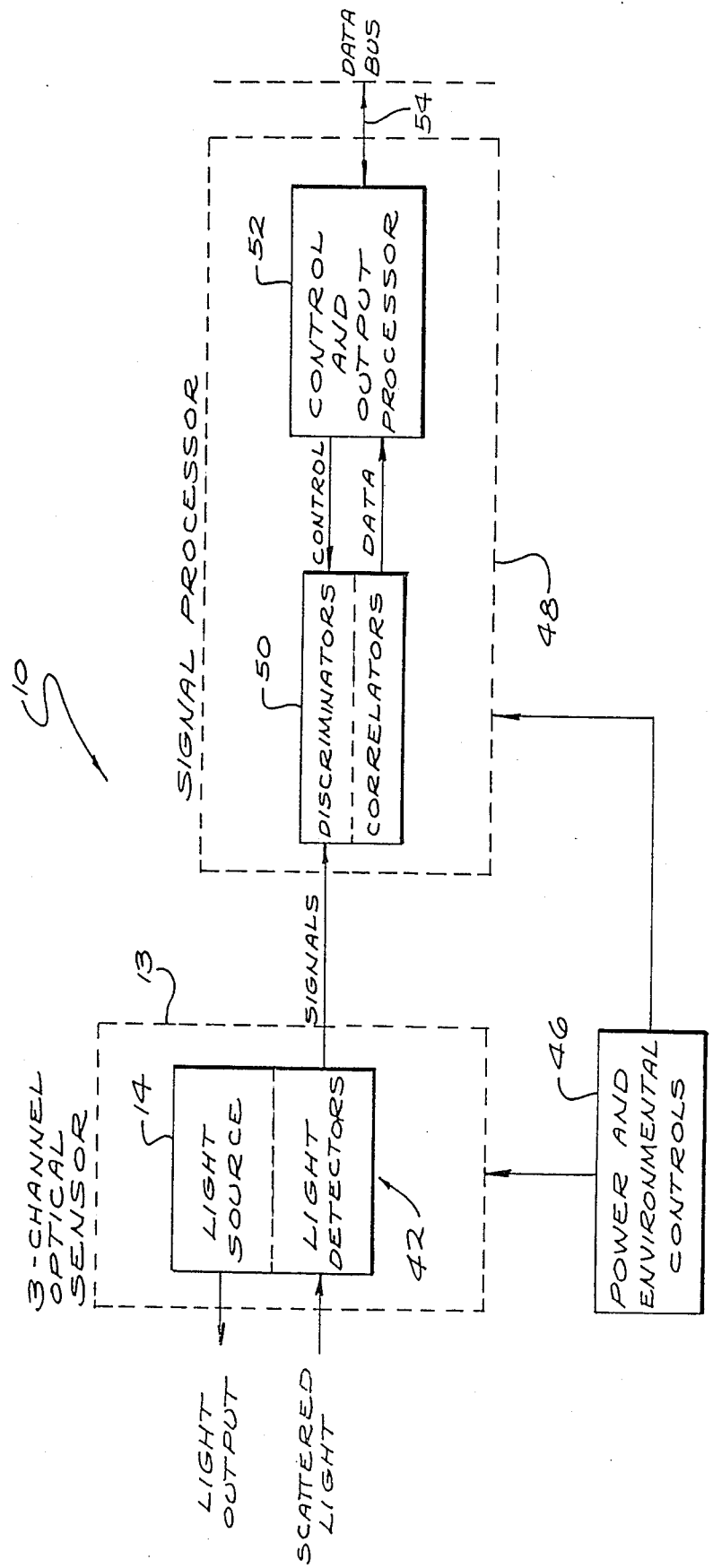
FIG. 1 is a schematic block diagram illustrating a system such as may be disposed on an airborne vehicle for transmitting light through the atmosphere and for receiving and processing the light scattered to the vehicle from aerosol particles in the atmosphere.
Figure 10:
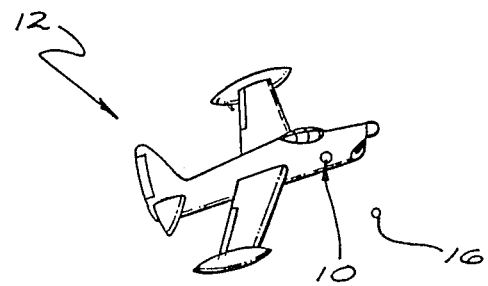
FIG. 10 is a view schematically showing the airborne vehicle and further schematically showing an aerosol particle which scatters light to the vehicle.

In one embodiment of the invention, a system is generally indicated at 10 in FIG. 1 for determining a function of the movement relative to the atmosphere of an airborne vehicle such as is indicated schematically at 12 in FIG. 10. It includes sources generally indicated at 14 (in FIG. 1) for directing energy into the atmosphere. The energy may be light having a high intensity. Preferably the light is substantially coherent. The substantially coherent light may have a suitable wavelength such as may be outside the visible region. The light source 14 may be included in an optical sensor indicated in broken lines at 13 in FIG. 1.

Figure 3:
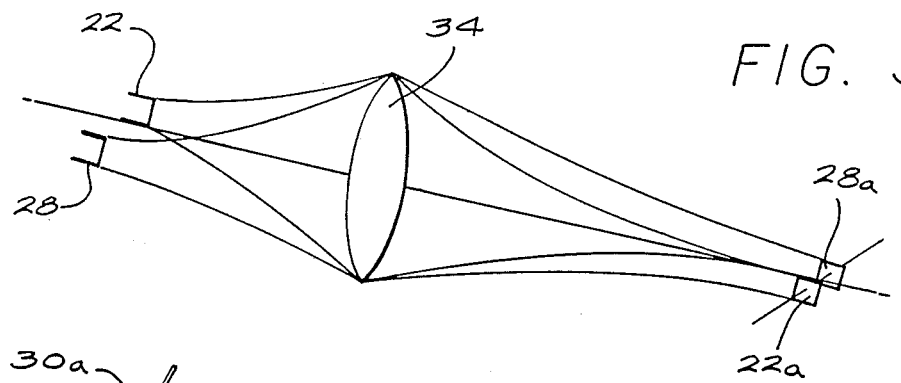
FIG. 3 is a perspective view schematically showing how a pair of light sources and a lens is projected to form part of a pattern to be crossed by aerosol particles.
Figure 5:
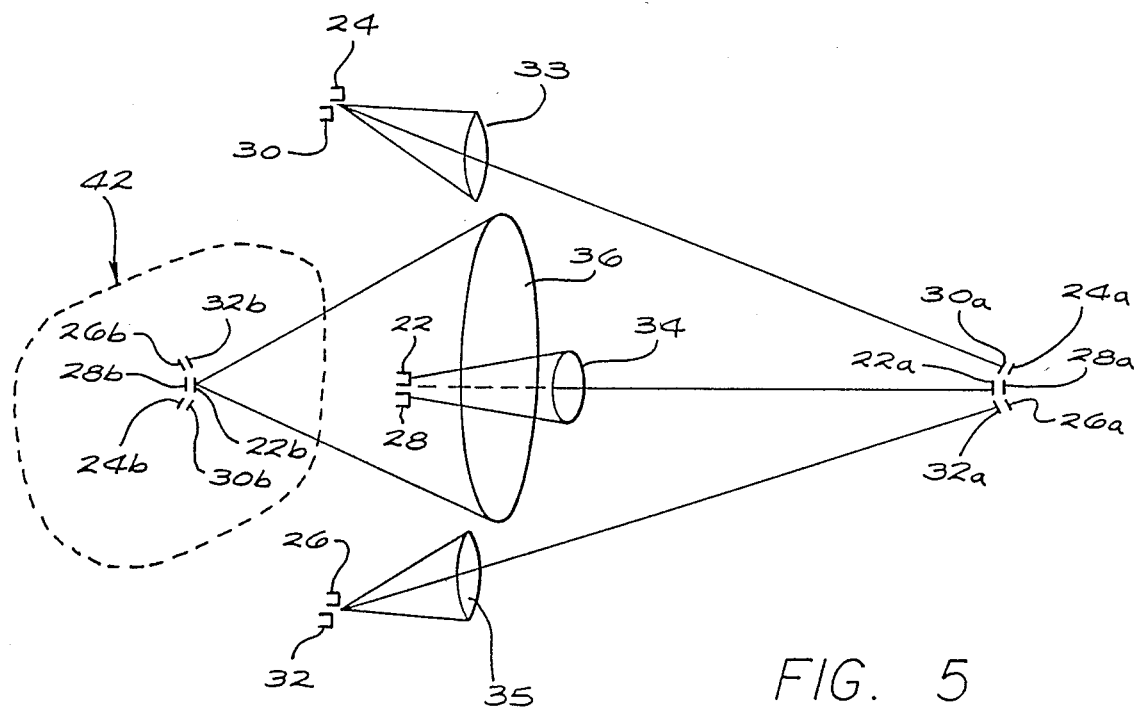
FIG. 5 is a perspective view schematically showing the relative disposition on the airborne vehicle of the different light sources, including three (3) pairs of those such as are shown in FIG. 3, for transmitting light to the sample volume through which the aerosol particles move, and one (1) receiver lens capable of imaging the test pattern shown more fully in FIG. 4.

The light from the source 14 is produced by line sources 22 and 28 in FIGS. 3 and 5 and imaged by a transmitting lens 34 into the sample volume represented by the neighborhood of 22a and 28a. Similarly, the light from the source 14 is produced by line sources 24 and 30 in FIG. 5 and imaged by a transmitting lens 33 in a sample volume represented by a neighborhood similar to that of 22a and 28a. The light from the source 14 is also produced by line sources 26 and 32 in FIG. 5 and imaged by a transmitting lens 35 in a sample volume represented by a neighborhood similar to that of 22a and 28a.

The light from each source may typically fill its associated transmitting lens. Several of these transmitting lenses may be disposed in symmetrical or assymetrical patterns around a receiving lens 36. FIG. 3 shows a typical transmitter unit of which there may be three (3) or more. In FIG. 5, the transmitting lenses 33, 34 and 35 are shown in a symmetrical pattern around the receiving lens 36.

Scattered light from a typical pattern 22a, 24a, 26a, 28a, 30a and 32a (FIG. 4) is reimaged on a group or array of detectors or a composite detector in the pattern 22b, 24b, 26b, 28b, 30b and 32b. The planes of typically 22 and 22a are conjugate in the transmitter lens and those of 22a and 22b are conjugate in the receiver lens 36. The detectors 22b, 24b and 26b may be considered to constitute a detector array 38 in FIG. 5.

Figure 4:
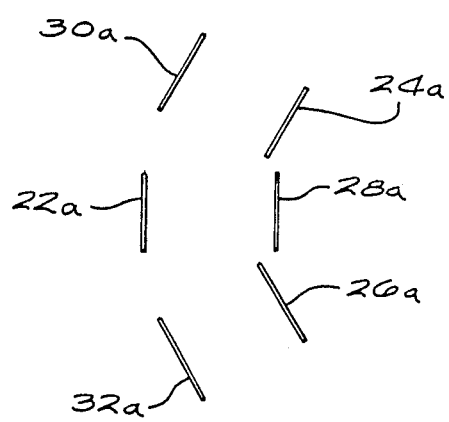
FIG. 4 is a schematic view showing the relative disposition of the projected light sources in the sampling volume where they may be crossed by aerosol particles.

FIG. 5 is a perspective view schematically including three (3) such transmitters and showing a typical composite sample volume and how it may be produced and imaged. FIG. 4 is a typical cross section in the plane of the line sources 22a, 24a, (etc.). A similar pattern may be provided for the detectors 22b, 24b (etc.). There are many such patterns which may be used to accomplish the function of this device, according to the application requirements.

In one embodiment, the individual sheets represented by the line sources 22, 24 and 26 and the line sources 28, 30 and 32 in pairs are parallel to each other, and the groups of pairs may be inclined to each other in different directions. Thus the line sources 22 and 28, the line sources 24 and 30 and the line sources 26 and 32 in pairs are parallel to each other, and the groups of pairs may be inclined relative to the other pairs, preferably in symmetry about each other in different directions. A visual model may conveniently exemplify such a distribution by likening the propagating light beams to the poles of an American Indian type teepee, where pairs of adjacent poles are parallel.

The entire array as described above, together with others similar to or different from it, may be situated at one of several sites upon the airborne vehicle such that the plane containing lenses 33, 34, 35 and 36 lies parallel, or approximately so, to the surface of the vehicle.

The light directed from the source 14 is scattered by aerosol particles, such as a particle 16 in FIG. 10, in the atmosphere. These aerosol particles may be particles which occur naturally in the atmosphere. The particles may also include particles of water or ice, sulfuric acid, salt, micrometeorite or organic debris, volcanic ejections and windborne dust. These aerosol particles are in general sufficiently small so that they are substantially stationary with respect to the atmosphere in which they are entrained. The aerosol particles may be fairly uniformly distributed within a volume of atmosphere similar in size to the airborne vehicle. Thus, by observing the relative motion of such aerosol particles with respect to the airborne vehicle, it is possible to determine the velocity and other characteristics such as attitude of the vehicle with respect to the surrounding atmosphere. The aerosol particles occur sufficiently infrequently in the upper atmosphere so that the information obtained from the energy scattered to the airborne vehicle 12 from one aerosol particle does not tend to interfere with the information extracted from the energy scattered to the vehicle from other aerosol particles.

The light scattered from the aerosol particles such as the particle 16 is received by a lens 36 (FIG. 5). The lens 36 may be disposed centrally with respect to the paired sources 22 and 28, the paired sources 24 and 30 and the paired sources 26 and 32. The light received by the lens 36 is directed to a detector array 42. One detector in the detector array 42 is disposed to receive the light directed only by 22a in the array of FIG. 4 to the aerosol particles and scattered by the aerosol particles to the airborne vehicle. Similarly, another detector in the array 42 of FIG. 5 is disposed to receive the light directed by the array 28a of FIG. 4 to the aerosol particles and scattered by the aerosol particles to the airborne vehicle 12.

As shown in FIG. 1, the operation of the source 14 and the detector assembly 42 (both included within a 3-channel optical sensor 13 in FIG. 1) may be controlled by power and environmental controls 46. The power may be introduced to the source 14 to energize the sources and may be introduced to the detector assembly 42 to energize the detectors. The environmental controls may be provided to maintain the source 14 and the detector assembly 42 at particular temperatures.

The signals produced by the detector array 42 are introduced to a signal processor indicated in broken lines at 48 in FIG. 1. This invention is essentially embodied in the signal processor 48. The signal processor 48 may include discriminators and correlators 50. The discriminators operate to select particular signals from the detector array 42 for further processing. The correlators operate to correlate the selected signals to derive information from the transit time measured as a result of such correlation.

The operation of the discriminators and correlators 50 is controlled by signals from the computer portion of a control and output processor 52. The correlated information is introduced to the output processing portion of the output processor 52 for further processing. The output from the computer portion of the control and output processor 52 is introduced to a data bus 54.

Figure 2:
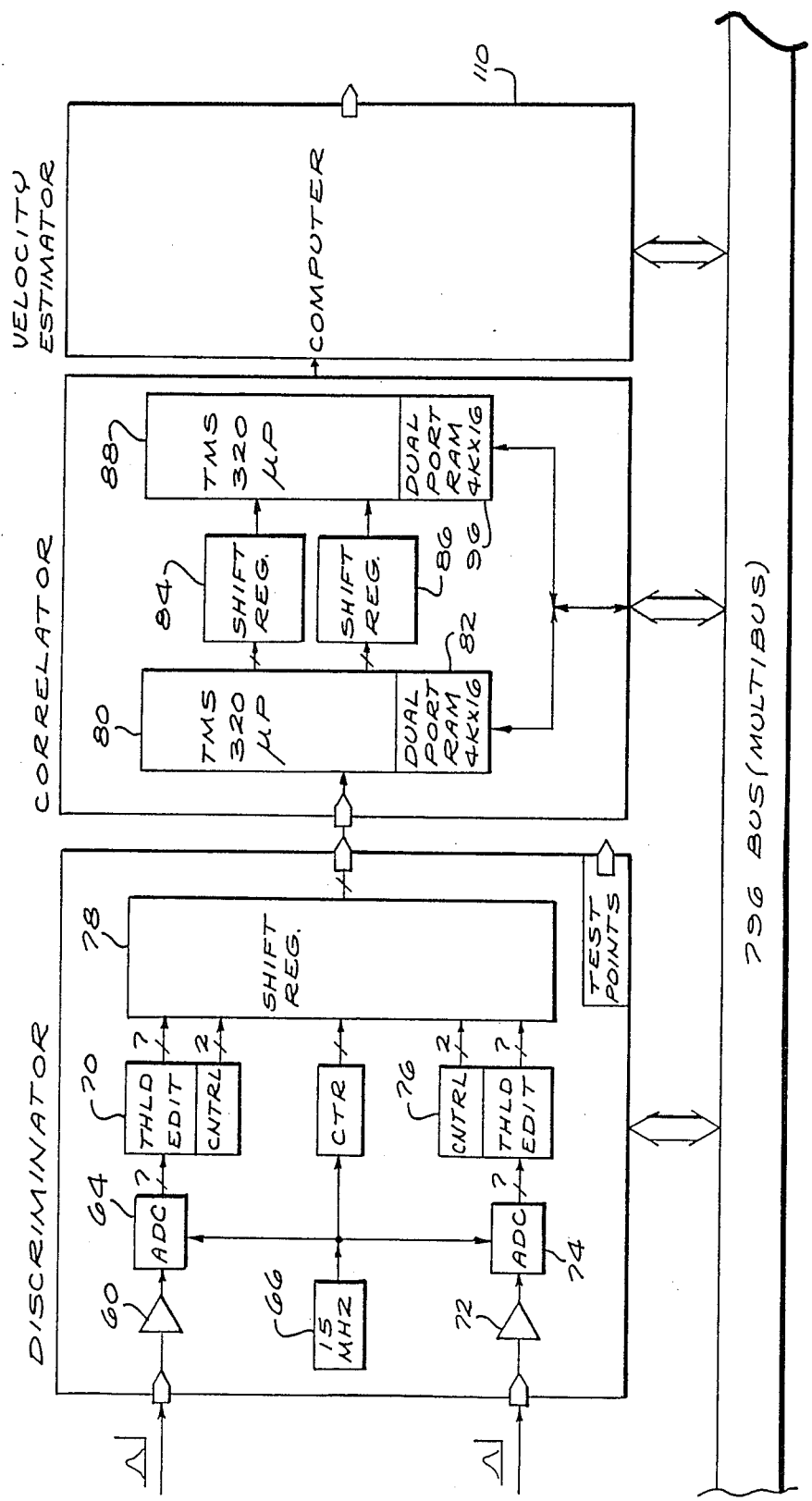
FIG. 2 is a schematic block diagram illustrating in additional detail a signal processor in the system shown in FIG. 1.

The signals received by one of the detectors, such as the detector 22b, in the detector array 42 are introduced to an amplifier 60 in FIG. 2. The amplifier 60 has a variable gain to assure that the amplifier will continue to operate in the optimal portion of its operating range when changes occur in the sizes of the particles scattering the light to the detectors in the detector array 42 such as the detector 22b. The amplifier 60 also operates to pass signals within a particular frequency bandwidth whose profile in the frequency domain may correspond to a Gaussian or other shape that is similar to that of the shape of the light distribution in the illuminated region. This bandwidth may be controlled by information derived from the correlator and its associated processor 52. This information is based upon current estimates of the speed of movement of the airborne vehicle 12. The bandwidth of the amplifier 60 may be varied under such circumstances since the speed of the airborne vehicle 12 affects the time for the particle to travel across one illuminated region and also between to regions.

The signals from the amplifier 60 (FIG. 2) are introduced to an analog-to-digital converter 64 which may be constructed in a conventional manner. The converter 64 converts the amplitude of each signal from the amplifier 60 to binary signals having logic levels coding for such amplitude. The production of the binary signals in the converter 64 may be synchronized by the introduction to the converter of clock signals from a generator 66 at a suitable frequency such as approximately forty megahertz (40 MHz , which frequency may be increased for higher speed applications.

The binary signals from the converter 66 then pass to a threshold editor 70. The threshold editor 70 passes only signals having an amplitude satifying a chosen editorial algorithm which may include, but not be limited to, being above a particular amplitude. This acceptance criterion may be adjusted by the threshold editor 70 in accordance with various conditions including the average amplitude of all of the signals passing to the threshold editor, the level of background noise and other variable factors. In this way, the threshold editor 70 eliminates much of the noise received by the detector such as the detector 22b.

In like manner, the signals from another of the detectors in the detector array 42, such as the detector 28b, may be introduced to an amplifier 72 corresponding to the amplifier 60. The gain of the amplifier 72 may be adjusted so that the amplifier operates on the signals from the detector array 40 in the optimal portion of its range. The signals from the amplifier 72 are introduced to an analog-to-digital converter 74 whose operation is synchronized by the clock signals from the clock generator 66. The resultant signals from the converter 74 are introduced to a threshold editor 76 which may operate in a manner similar to that of the editor 70. The feedback control mechanisms may differ between channels to accommodate changes in performance.

The signals from the editors 70 and 76 are introduced to a shift register 78, referred to in the trade as a FIFO, or first-in first-out memory. The time at which each edited entry has occurred is loaded into the shift register 78 simultaneously with each edited entry. The shift register 78 operates in a conventional manner to receive signals from a real time clock, and the editors 70 and 76 at one end, shift the signals through the shift register and pass the signals from the shift register to a microprocessor 80. The operation of the microprocessor 80 need not be synchronized with the clock signals from the generator 66.

The earlier editing algorithm ensures that all contiguous and successive entries into the FIFO 78 are derived from the same particle. At the end of an edit acceptance cycle, a marker signal is entered into the FIFO 78 to indicate that the members of the adjacent group are derived from a new particle.

The microprocessor 80 groups the signals received by that part of the detector array 42 comprising the detectors such as the detectors 22b and 28b from each individual aerosol particle 16 in the atmosphere. The microprocessor 80 is able to group the signals received by the detectors 22b and 28b from each aerosol particle independently of the grouping of the signals received by the detector from the other aerosol particles. A typical signal produced by the microprocessor 80 to represent the light scattered by the aerosol particle 16 to the detectors such as the detectors 22b and 28b is illustrated at 62 in FIG. 6.

The microprocessor 80 then sums the amplitudes of all of the signals received by the detectors such as detectors 22b and 28b from each aerosol particle to obtain a resultant amplitude for the signal from each transit of each aerosol particle. These signals may be generally indicated at 81 in FIG. 6. The microprocessor 80 also sums the successive products of amplitude and time for each successive FIFO entry. The microprocessor 80 then divides the second sum by the first sum. The division of the second sum by the first sum provides for a measurement of the time at which the particle crossed the central point of the illuminated region. This measurement is to a significantly higher resolution and accuracy than the interval between the analog-to-digital converter samples, i.e. the interval between the internal clock pulses. This represents the most probable time at which the particle crossed the peak of the illuminated region. It may be considered as the "centroid" time of each signal received by either of the detectors in a pair, such as the detectors 22b and 28b, from each aerosol particle. This centroid may be used in subsequent processing of information to indicate the movement of the airborne vehicle in the atmosphere.

The microprocessor 80 now loads into second shift registers 84 and 86 two words for each particle transit event. These are the time and amplitude associated with the transit of a single aerosol particle across one of the illuminated sheets in the pattern of the detectors corresponding to the patterns in FIG. 4 for the line sources. The microprocessor 88 then processes all possible pairs of amplitude and time signals for which the differences in time are less than the delay time of interest, typically the length of the abscissa of the correlogram. Hence, the microprocessor 88 determines the time difference between each of the signals from a detector such as the detector 22b and each of the successive signals from another detector such as the detector 28b. The microprocessor 88 stores this time difference for later use as the address in the correlogram domain. The microprocessor 88 then multiplies the amplitudes of the signals in each of the different pairs and retains the product amplitude of these signals. The resultant signals representing the product amplitudes of pairs of signals are stored in a dual port ram 96 associated with the microprocessor 88.

Figures 6, 7:
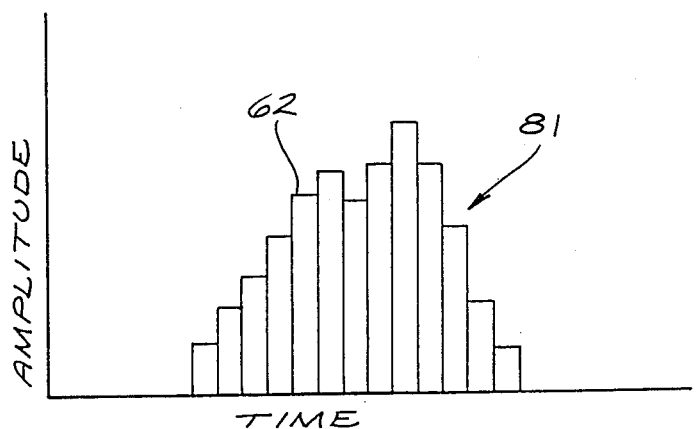
FIG. 6 is a histogram schematically illustrating signals representing the pattern of light scattered by an aerosol particle, in its transit of one of the two (2) optically illuminated regions in the atmosphere, to the detectors shown in FIG. 5 after the signals have been converted to a digital form.
FIG. 7 is a chart illustrating the light signals received by the detectors of FIG. 5 from different (or the same) aerosol particles and the time(s) at which the detectors receive such light signals.
Figure 8:
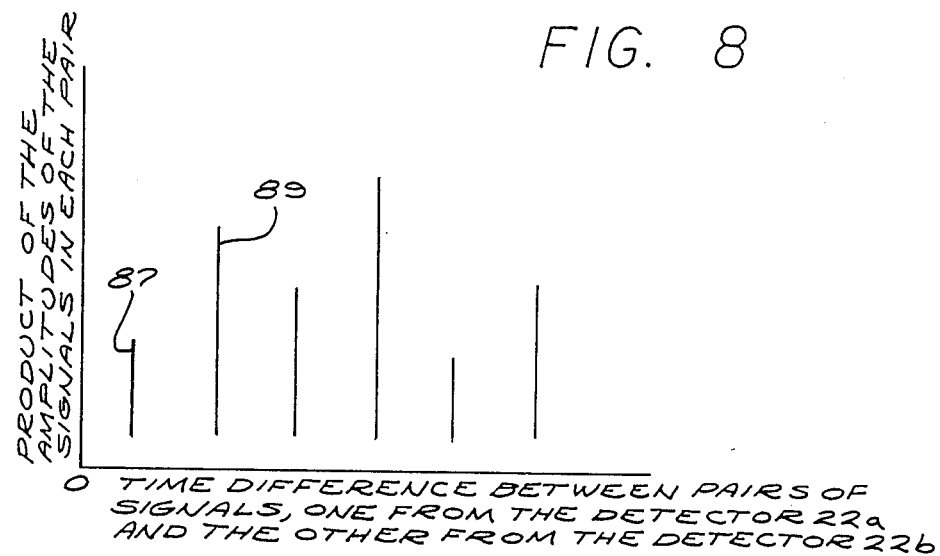
FIG. 8 is a graph showing how the signals shown in the chart of FIG. 7 are processed by the system of this invention to produce pairs of signals separated by individual time differences and having amplitudes representing products of the amplitudes of the signals in each pair.

The operation of the microprocessor 88 as described in the previous paragraph may be seen from the schematic illustration in FIGS. 7 and 8. As shown in FIG. 7, the time between a signal $A_1$ from a detector such as the detector 22b and a signal $B_{1.0}$ from a detector such as the detector 28b is shown as $A_1-B_{1.0}$. When the next signal $B_{1.1}$ is received by a detector such as the detector 28b from the light scattered by the same particle as that producing the signal $A_1$ at the detector such as the detector 22b, a time difference of $A_1-B_{1.1}$ is produced in the microprocessor 88.

In FIG. 8, the time difference between each of the signals from a detector such as the detector 22b and each of the successive signals from a detector such as the detector 28b is shown along the horizontal axis. The product of the amplitudes of the signals in this pair is shown along the vertical axis. For example, the product of the amplitudes $A_1$ and $B_{1.0}$ and the product of the amplitudes $A_1$ and $B_{1.1}$ may be as shown at 87 and 89 on the vertical axis of FIG. 8.

By multiplying the paired signals such as the signals $A_1$ and $B_{1.0}$ and the signals $A_1$ and $B_{1.1}$, strong signals scattered from individual correlated particles, that is, those which cross one sheet and then the next, are emphasized relative to other signals. These other signals may arise from attempts to correlate events from different particles, from one particle with a false "noise" event, or from two "noise" events. This may be seen from a relatively simple example as discussed in the next paragraph.

If each of two signals has an amplitude of ten (10), then the product of these amplitudes is 100. However, if the amplitude of one of these signals is decreased by a factor of two (2), indicating that it may have arisen from a smaller, and hence different, particle, the product of the amplitudes will be reduced by the same factor, that is to fifty (50). The event will accordingly carry proportionally less weight in the final calculation.

A second method of discriminating events arising from different particles or from a particle and nose or from different instances of noise, as against an event arising from the same particle, is to weight the event by the similarity of the signals from each of the contributing particles. This may be done simply by dividing the amplitudes and weighting the event by the quotient if that quotient is unity or less and by weighting the event by its reciprocal if it is greater than unity.

The products of the amplitudes of pairs of signals and time differences between the signals in pairs, as derived from the microprocessor 88 as described in the previous paragraphs, are stored in the dual port random access emory 96. The memory 96 may form a part of, or may be associated with, the microprocessor 88.

The microprocessor 88 divides into successive time bins or time increments the signals temporarily stored in the dual port random access memory 96. Each of the successive time bins may have a particular duration such as approximately ten (10) microseconds. Each time bin in the microprocessor 88 contains all of the signals available to it. The successive time bins are illustrated at 90 in FIG. 9 and the signals in these time bins are illustrated at 92 in FIG. 9. The total time for all of the time bins may be one half of a millisecond (0.5 ms) to one millisecond (1 ms) depending upon the speed of the airborne vehicle 12 for which the system is designed. The number of time bins in that period may be approximately sixty four (64). Different signals in the time bins may illustratively be seen at 92a, 92b and 92c in FIG. 9.

Figure 9:
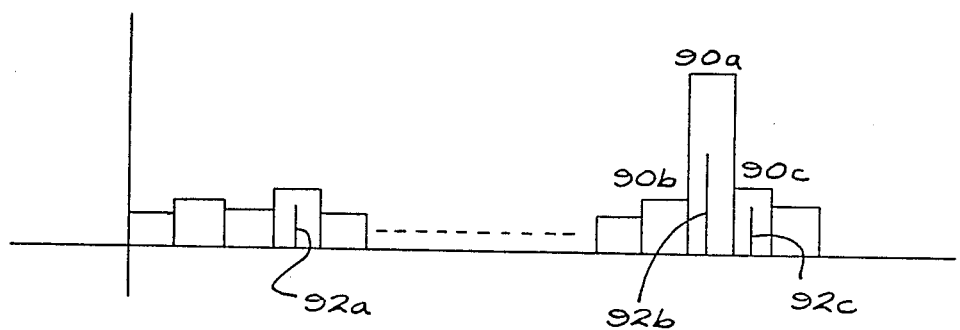
FIG. 9 is a graph showing how the signals in FIG. 8 are separated into time bins to provide for further processing of such signals.

The microprocessor 88 then operates to compare the magnitudes of the accumulated sums of the signals in each bin and to select the bin with the highest magnitude of the accumulated sums of signals. In FIG. 9, this time bin is designated as 90a. The microprocessor 88 also operates to select two additional time bins. One of these additional time bins is immediately adjacent to one side of the selected time bin and the other additional time bin is immediately adjacent the other side of the selected time bin. In FIG. 9, these adjacent time bins are illustrated at 90b and 90c.

The time bins such as the time bins 90b and 90c, adjacent to the selected time bin such as the time bin 90a are included with the time bin 90a to assure the proper operation of the system constituting this invention. For example, all of the signals originating in the selected time bin such as the bin 90a from the correlator 50 (FIG. 1) may occur near one boundary of the selected time bin. Since the time boundaries of the time bins 90 are selected without reference to the current transit time, the occurrence of all of such signals near one time boundary of the selected bin such as the bin 90a may indicate that pertinent signals may also occur in the adjacent bin. It is for this reason, among others, that the adjacent time bins such as the bins 90b and 90c are selected in addition to the time bin 90a.

The consequences of the fixed boundaries of the time bins 90 may be seen from another standpoint. Although the duration of each time bin is the same as the duration of the other time bins, there is a reciprocal relationship between the speed and the time. This causes the equally spaced bins in the time domain to appear as if they were harmonically distributed in the domain of speed. The effective width of the different time bins may therefore be dependent upon the speed of the airborne vehicle 12. For example, as the speed of the airborne vehicle 12 is increased, even though the effective resolution of the time bins may be decreased the time bins remain of the same duration. This results from the fact that the energy directed from the source 14 in the airborne vehicle 12 has a greater tendency to encounter aerosol particles in a given time increment at increased speeds than at reduced speeds.

The numbers of the three bins 90a, 90b, and 90c in FIG. 8 are recorded temporarily by the microprocessor 88. During the next data acceptance period, all events in these three bins are stored individually and those in all other bins are accumulated as before. The microprocessor 88 then processes all of the individual signals to calculate the centroid of these events in the correlogram domain in a way analogous to the method which was used in the time domain to find the best estimate of the peak transit time. Events associated with false triggers from noise will be uniformly distributed thoughout the whole correlogram domain (because they are uncorrelated) and therefore, if uncorrected, cause errors in the calculated centroid. To prevent this, the background noise is calculated as the mean level of all the bins except the three that have been selected for processing for signal identification.

The mean level is subtracted from the equivalent amplitudes of the events in the three (3) selected bins. The microprocessor 88 then processes all of the individual signals to calculate the centroid of these events in the correlogram domain in a way analogous to the method which was used in the time domain to find the best estimate of the peak transit time. Thus, the uniform background bias is removed from the estimate of transit time in these three (3) selected bins. If not removed, this error depends not only upon the background noise, but upon the exact position within the bin of the signals peak.

As will be appreciated, this time difference represents the difference in time between the reception of light received by the detectors such as the detectors 22b and 28b from the same aerosol particle. The processing of this time difference may then be provided in a manner known in the prior art to obtain a determination of the movement of the airborne vehicle 12 in the atmosphere.

It will be appreciated that, as microprocessors become increasingly complex, a single microprocessor may be able to accomplish the same functions as have previously been performed by several microprocessors. For example, the functions of the shift registers 84 and 86 and the microprocessors 80 and 88 may be accomplished within only one of the microprocessors 80 or 88. Such a performance of functions within one microprocessor would be considered to be within the scope of the invention.

The system constituting this invention has certain important advantages. It first reduces background noise on an analog basis by filtering the received signals to pass only signals within a particular frequency range dependent upon the speed of the airborne vehicle. It additionally reduces the effects of background noise on a digital basis by determining the average amplitude of all of the received signals including noise and then passing only signals having an amplitude above the average. This is a non-linear filtering process.

The system then passes only the digital signals above a particular threshold dependent upon the average amplitude of the noise. The system then converts the signals above the threshold into groups of signals each representing the light scattered from an individual one of the aerosol particles. The system then determines the time centroid of the signals representing the light scattered from each individual one of the aerosol particles.

As will be seen from the previous two (2) paragraphs, the system of this invention provides progressive processing of the received signals. This processing is provided to separate the signals from the background noise and to assure that only strong signals will be further processed. These signals represent transits of particles more often than false events derived from fluctuations in the background noise. It is a main function of the system to select the most events arising from real particle transits while minimizing the number of false events arising from all other sources. This progressive processing in partially analog and partially digital.

The system then pairs signals individually received by the detector array 38 and processes these signals to determine the time difference between the signals in each pair. The system then processes the paired signals in a manner to focus progressively on a single pair of signals whose collective amplitudes indicate that they may be a correlated transit of both illuminated patterns by a single particle. The time difference between this single pair of signals is then used to determine the speed and attitude of the airborne vehicle relative to the surrounding mass of air in the atmosphere.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination in an airborne vehicle for determining the movement of the airborne vehicle relative to the atmosphere,
   first means disposed on the vehicle for directing light into the atmosphere, 2. In a combination as set forth in claim 1,
   the fourth means being operative to obtain a first sum of the signals reflected to the second and third means for each individual particle and for obtaining a second sum of the product of each of such signals for each particle and the time of each such signal and for dividing the second sum by the first sum.

3. In a combination as set forth in claim 1,
   the sixth means including:
   eighth means for determining the product of the amplitudes of the signals in each pair,
   ninth means for dividing the product amplitude signals into individual time bins in accordance with the time differences between the paired signals producing such product amplitudes, and
   tenth means for processing the product amplitude signals in the individual time bins to select a particular time difference for further processing to determine the movement of the airborne vehicle in the atmosphere.

4. In combination in an airborne vehicle for determining the movement of the airborne vehicle relative to the atmosphere,
   first means disposed on the vehicle for directing light into the atmosphere,
   second and third means disposed on the vehicle in spaced relationship for receiving light received by particles in spaced and scattered by the particles to the vehicle and for producing signals in accordance with such received light,
   fourth means responsive to the signals from the second and third means for grouping the signals in time in accordance with the scattering of the light from individual ones of the particles,
   fifth means responsive to the signals from the fourth means for determining the centroid in time of the signals in each group,
   sixth means for pairing each of the signals from the second means with successive signals from the third means and for determining the cumulative effect of the amplitudes of the signals in each pair, and
   seventh means responsive to the signals from the sixth means for processing the cumulative effects of the amplitudes of the signals in each pair to provide for a determination of the movement of the airborne vehicle relative to the atmosphere.

5. In a combinations as set forth in claim 4 wherein
   the fifth means determines the sum of the amplitudes of the signals in each individual group and the sum of the product of the amplitude of each of the signals in such group and the time for each such signal and divides the second sum by the first sum.

6. In a combination as set forth in claim 4 wherein
   the sixth means obtains the product of the amplitudes of the signals in each pair and the seventh means divides the signals from the sixth means into successive time bins and processes the product amplitude signals in the successive time bins to provide for a determination of the movement of the airborne vehicle relative to the atmosphere.

7. In a combination as set forth in claim 6 wherein the seventh means further includes means for selecting the time bin with the greatest average of the product amplitude signals in that time bin and for selecting the adjacent time bins and wherein the seventh means further includes means for processing the signals in the selected time bins to provide for a determination of the movement of the airborne vehicle relative to the atmosphere.

8. In a combination as set forth in claim 7 wherein means are included for selecting the median position in the selected time bin to provide for a determination of the movement of the airborne vehicle relative to the atmosphere.

9. In combination in an airborne vehicle for determining the movement of the airborne vehicle relative to the atmosphere,
first means disposed on the vehicle for directing a beam of energy from the vehicle,
second and third means disposed on the vehicle in spaced relationship to each other for receiving scatterings of the energy from particles displaced from the vehicle and for producing signals in accordance with such received energy,
means for processing pairs of signals, one of the signals in each pair being obtained from the second means and the other signal in each pair being obtained from the third means, to obtain time differences between the signals in each pair,
means for dividing the paired signals into successive time periods in accordance with the time difference between such paired signals,
means for processing the paired signals in the different time bins for selecting particular time bins for further processing, and
means responsive to the pairs of signals in the selected time bins for processing the paired signals in each time bin to provide for a determination of the movement of the airborne vehicle relative to the atmosphere.

10. In a combination as set forth in claim 9 wherein the means for processing the pairs of signals includes means for obtaining the product of the amplitudes of the signals in each pair, and
the means for selecting the particular time bins includes means for selecting the particular time bins on the basis of the maximum average amplitude of the product amplitude signals in the different time bins.

11. In a combination as set forth in claim 10,
amplifier means having a variable gain,
means responsive to the signals from the second and third means for adjusting the gain of the amplifier means,
means for introducing the signals from the second and third means to the amplifier means, and
the means for processing the pairs of signals being responsive to the signals from the amplifier means.

12. In a combination as set forth in claim 10,
the amplifier means being operative to filter the signals from the second and third means to pass only the signals within a particular bandwidth dependent upon the speed of the airborne vehicle.

13. In a combination as set forth in claim 11,
means for providing clock signals,
means responsive to the filtered signals for converting the filtered signals to digital form,
the means for processing the pairs of signals being responsive to the signals in digital form, and
means for synchronizing the production of the clock digital signals in accordance with the production of the clock signals.

14. In combination in an airborne vehicle for determining the movement of the airborne vehicle relative to the atmosphere,
first means disposed on the vehicle for directing energy into the atmosphere,
second and third means disposed on the vehicle in spaced relationship to each other for receiving energy scattered to the vehicle from particles in the atmosphere,
fourth means responsive to the signals from the second and third means for processing the signals to eliminate signals below a particular amplitude level,
fifth means responsive to the processed signals from the second and third means for operating upon the signals scattered to the vehicle from each individual one of the particles to determine the centroid of such signals,
sixth means for separately classifying the signals passing through the fourth means from each of the second and third means and for indicating the time difference between each of such signals from the second means and each of such successive signals from the third means,
seventh means responsive to the signals from the fifth means for processing the signals from the sixth means in progressive increments of the time difference from the sixth means to select the signals from only particular ones of such progressive increments, and
eighth means for processing the signals from the particular time increments to determine the movement of the airborne vehicle relative to the atmosphere.

15. In a combination as set forth in claim 14,
means providing a variable threshold,
means for adjusting the threshold of the variable threshold means in accordance with the speed of the airborne vehicle,
means for introducing the second and third signals to the variable threshold means, and
the fifth means being responsive to the signals from the variable threshold means.

16. In a combination as set forth in claim 15,
the eighth means including means for obtaining the product of the amplitude of each of the signals passing from the second means through the fifth means for each particle and the amplitude of each of the successive signals passing from the third means through the fifth means for such particle for processing the product amplitude signals to provide for a determination of the movement of the airborne vehicle relative to the atmosphere.

17. In a combination as set forth in claim 16,
the centroid means being operative to operate upon signals from the second means and the signals from the third means for individual ones of the particles in accordance with the amplitudes and times of such signals to determine the centroid of the signals from each individual one of the particles.

18. In a combination as set forth in claim 17, the processing means being further operative to process the product amplitude signals on the basis of time differences between the signals in the pairs to provide for a determination of the movement of the airborne vehicle relative to the atmosphere.

19. In a combination as set forth in claim 4,
the fourth means being operative to filter the signals from the second and third means to pass the signals only within a particular band pass,
the seventh means including means for obtaining the product, in the progressive increments of the time difference, of the amplitudes of the signals passing in such time increments from the third means through the fifth means and the amplitude of the preceding signal passing from the second means through the fifth means and for processing the product amplitude signals in accordance with the time differences between the pairs of signals producing such product amplitudes, and
the eighth means including means for separating the product amplitude signals into different time bins and for processing the product amplitude signals in the different time bins to provide for a determination of the movement of the airborne vehicle relative to the atmosphere.

20. In a combination as set forth in claim 14,
the fifth means including means for operating upon the the signals scattered to the vehicle from each individual one of the particles and upon the times of such signals to determine the centroid of the signals scattered to the vehicle from each individual one of the particles.

21. In a combination as set forth in claim 20,
the processing means being operative to classify the pairs of signals into successive time bins on the basis of the time differences between the signals in the pairs and to select particular time bins in which the average amplitude of the product amplitude signals is strongest.

22. In combination in an airborne vehicle for determining the movement of the airborne vehicle relative to the atmosphere,
first means for directing energy from the airborne vehicle,
second and third means displaced from each other for receiving energy scattered from a particle in the atmosphere and for producing signals in accordance with such received energy,
means for filtering noise from the signals received by the second and third means,
first converting means from converting the filtered signals from the second means to digital signals,
second converting means for converting the filtered signals from the third means to digital signals,
first digital means having a digital threshold variable in accordance with the filtering of the noise from the received signals,
second digital means having a digital threshold variable in accordance with the speed of the airborne vehicle,
means for providing clock signals,
means for synchronizing the operation of the first converting means with the clock signals,
means for synchronizing the operation of the second converting means with the clock signals,
means responsive to the synchronized signals from the first and second converting means and to the digital signals above the threshold for determining the centroid of the energy scattered to the vehicle from each particle,
means responsive to the signals from the first and second digital means for obtaining the product of the amplitudes of the signals received by the second means from each of the particles and the amplitudes of the successive signals received by the third means, and
means for processing the product amplitude signals to provide for a determination of the movement of the airborne vehicle relative to the atmosphere.

23. In combination in an airborne vehicle for determining the movement of the airborne vehicle relative to the atmosphere,
first means disposed on the vehicle for directing energy into the atmosphere,
second and third means disposed on the vehicle in spaced relationship to each other for receiving energy scattered to the vehicle from particles in the atmosphere,
means for passing the received signals in a particular frequency band dependent upon the speed of the airborne vehicle,
means for averaging the amplitudes of the received signals and passing only signals above an amplitude related to such average, and
means responsive to the signals passed by the last mentioned means to provide for a determination of the movement of the airborne vehicle relative to the atmosphere.

24. In a combination as set forth in claim 23,
means for operating upon the signals received by the second and third means from each particle to determine the centroid of such signals.

25. In a combination as set forth in claim 23,
the determining means being operative to pair each signal from the second means for each particle and each of the successive signals from the third means and to process the paired signals to provide for the determination of the movement of the airborne vehicle in the atmosphere.

26. In a combination as set forth in claim 25,
the determining means being operative to obtain the product of the amplitudes of the paired signals and the time difference between the paired signals and to use such product amplitudes and such time differences for providing for the determination of the movement of the airborne vehicle in the atmosphere.

27. In combination in an airborne vehicle for determining the movement of the airborne vehicle relative to the atmosphere,
first means disposed on the vehicle for directing energy into the atmosphere,
second and third means disposed on the vehicle in spaced relationship to each other for receiving energy scattered to the vehicle from particles in the atmosphere,
means for converting the received signals to corresponding digital signals,
means for processing the digital signals to determine the centroid in time of the energy scattered to the vehicle from each particle,
means for pairing each digital signal from the second means and the successive digital signals from the third means, and means for processing the paired digital signals to provide a determination of the movement of the airborne vehicle relative to the atmosphere.

28. In a combination as set forth in claim 27,
the processing means being operative to to process each pair of signals on the basis of the product of their amplitudes and the time difference between them to provide for a determination of the movement of the airborne vehicle relative to the atmosphere.

29. In a combination as set forth in claim 28,
the processing means being further operative in accordance with the relative time differences between the signals in the different pairs to divide such time differences into bins and to process the amplitude product signals in the different time bins on the basis of the product amplitudes to provide for a determination of the movement of the airborne vehicle in the atmosphere in accordance with such time differences and such product amplitudes.

30. In a combination as recited in claim 28,
the averaging means providing a threshold for passing the digital signals dependent upon the average of all of the signals.

31. A method as set forth in claim 30, including the steps of:
retaining the signals within a particular pass band dependent upon the speed of the vehicle before the signals are processed,
removing noise from the received signals,
retaining the signals above a threshold level dependent upon the noise in the received signals, and
selecting the individual time bin with the strongest average combined amplitude of the signals in the pairs and the immediately adjacent time bins before and after such individual time bin.

32. A method as set forth in claim 30 wherein
the signals received by the detectors from each particle are processed to determine the centroid of the energy scattered to the vehicle from the particle.

33. A method of determining the movement of an airborne vehicle relative to the atmosphere, including the steps of:
directing energy into the atmosphere from the airborne vehicle and receiving at first and second detectors in the airborne vehicle energy scattered from aerosol particles in the atmosphere to produce signals in accordance with such received energy,
retaining the signals providing the strongest scattering of the energy to the airborne vehicle,
pairing the signal received by the first detector from each aerosol particle and successive signals received by the second detector and determining the time difference between each pair of signals,
processing the paired signals in successive time bins dependent upon the time differences between the signals in each pair and in accordance with the combined amplitudes of the pairs of signals,
selecting the time bins with the greatest average of the product amplitudes of the signals in the time bins, and
processing the signals in the selected time bins to obtain a determination of the movement of the vehicle relative to the atmosphere.

34. A method as set forth in claim 33, including the step of:
removing noise from the received signals, and
retaining the signals above a threshold level dependent upon the noise in the signals before the signals are processed.

35. A method as set forth in claim 33, including the step of:
retaining the signals within a particular pass band dependent upon the speed of the vehicle before the signals are processed.

36. A method of determining of the movement of an airborne vehicle relative to the atmosphere, including the steps of:
directing energy into the atmosphere from the airborne vehicle and receiving at the airborne vehicle energy scattered from aerosol particles in the atmosphere to produce signals in accordance with such received energy,
passing only the signals within a particular pass band dependent upon the speed of the airborne vehicle,
removing noise from the received signals,
converting the amplitudes of the passed signals to corresponding digital signals,
passing only the digital signals above a particular threshold dependent upon the average amplitude noise removed from the received signals, and
processing the digital signals representing the amplitudes of the passed signals from each individual aerosol particle to determine the centroid of such passed signals.

37. A method as set forth in claim 36, including the step of:
obtaining the sum of the amplitudes of the signals from each aerosol particle and the sum of the product of such amplitudes and the time of occurrence of such amplitudes and dividing the second sum by the first sum to determine the centroid of such signals.

38. A method as set forth in claim 36, including,
pairing the signals received from a first detector at the airborne vehicle and the successive signals received from a second detector spaced from the first detector at the airborne vehicle,
disposing in successive time bins pairs of signals in accordance with the difference in time between the signals in such pairs, and
processing the paired signals in the different time bins to provide for a determination of the movement of the airborne vehicle.

39. A method as set forth in claim 36 wherein,
the paired signals are processed by determining the product of the amplitudes of the signals in each pair and by averaging the magnitude of the product amplitude signals in each time bin and by selecting the time bin with the greatest average magnitude of the product amplitude signals.

40. A method as set forth in claim 39 wherein the time bins immediately adjacent the selected time bin are also selected and wherein a threshold is determined on the basis of the average ampitudes of the signals received in the other time bins and the product amplitude signals in the selected time bins are further processed on the basis of such determined threshold to provide for an determination of the movement of the airborne vehicle relative to the atmosphere.

* * * * *